(12) United States Patent
Le Devehat et al.

(10) Patent No.: US 8,511,720 B2
(45) Date of Patent: Aug. 20, 2013

(54) CLAMPING ASSEMBLY AND A HYDRAULIC COUPLER COMPRISING IT

(75) Inventors: Eugène Le Devehat, Saligny (FR); Renaud Le Devehat, Thorigny-sur-Oreuse (FR)

(73) Assignee: FMC Technologies SA, Sens (FR)

( * ) Notice: Subject to any disclaimer, the term of this patent is extended or adjusted under 35 U.S.C. 154(b) by 845 days.

(21) Appl. No.: 11/600,623

(22) Filed: Nov. 16, 2006

(65) Prior Publication Data

US 2007/0057507 A1    Mar. 15, 2007

Related U.S. Application Data

(63) Continuation of application No. 10/499,463, filed on Jun. 18, 2004.

(30) Foreign Application Priority Data

Dec. 21, 2001   (FR) ........................... 01 16781
Jan. 31, 2002   (FR) ........................... 02 01157
Dec. 19, 2002   (WO) ....................... PCT/EP02/14869

(51) Int. Cl.
    *F16L 23/00*    (2006.01)
(52) U.S. Cl.
    USPC ................................. 285/364; 285/45
(58) Field of Classification Search
    USPC ............. 285/45, 46, 310, 311, 312, 316, 364, 285/363, 368
    See application file for complete search history.

(56) References Cited

U.S. PATENT DOCUMENTS

| | | | |
|---|---|---|---|
| 1,994,361 A | 3/1935 | Johnson | |
| 2,392,702 A | 1/1946 | Saunders | |
| 2,536,602 A | 1/1951 | Goett | |
| 2,645,506 A * | 7/1953 | Sturgis | 285/310 |
| 2,869,403 A | 1/1959 | Bent | |
| 3,090,360 A | 5/1963 | Bennett et al. | |
| 3,168,335 A * | 2/1965 | Sumption | 285/316 |
| 3,330,299 A * | 7/1967 | Slawinski et al. | 285/311 |
| 3,612,579 A * | 10/1971 | Groves | 285/316 |
| 3,613,726 A * | 10/1971 | Torres | 285/316 |
| 3,661,408 A | 5/1972 | Gibbons | |
| 3,865,412 A | 2/1975 | Ashton | |
| 4,142,740 A | 3/1979 | Wilms | |
| 4,202,567 A | 5/1980 | Paddington | |
| 4,222,591 A | 9/1980 | Haley | |
| 4,867,000 A | 9/1989 | Lentz | |
| 4,923,219 A * | 5/1990 | Bormioli | 285/364 |
| 5,058,045 A | 10/1991 | Ma | |
| 5,166,650 A | 11/1992 | Simmons et al. | |
| 6,843,511 B2 | 1/2005 | Barry | |

* cited by examiner

FOREIGN PATENT DOCUMENTS

| | | |
|---|---|---|
| EP | 0 285 813 A1 | 3/1988 |
| EP | 0 349 333 A2 | 1/1990 |
| GB | 1 395 928 | 5/1975 |
| JP | 5-45325 | 6/1993 |

*Primary Examiner* — David E Bochna

(57) ABSTRACT

A coupler which is adapted to be connected to a complementary device for the transfer of a fluid between the coupler to the complementary device comprises a body through which the fluid is allowed to flow, at least one seal for providing a fluid-tight seal between the coupler and the complementary device, and a protecting device for the seal. The protecting device is movable between a first position before connection in which the protecting device projects beyond the seal in the direction of connection, and a second position after connection in which the protecting device no longer projects beyond the seal. The coupler also includes a damper for urging the protecting device towards its first position.

8 Claims, 6 Drawing Sheets

CLAMPING ASSEMBLY AND A HYDRAULIC COUPLER COMPRISING IT

This application is a continuation of U.S. patent application Ser. No. 10/499,463 filed on Jun. 18, 2004, which is based on PCT Patent Application No. PCT/EP2002/014869 filed on Dec. 19, 2002.

BACKGROUND OF THE INVENTION

The present invention relates in a general way to couplers.

As is well known, a coupler is a mechanical assembly comprising clamping modules, intended in particular for applying a pre-clamping force so as to provide mechanical linkage and fluid-tightness between an articulated product loading and unloading arms, in particular for fluid products, for example petroleum products (liquefied natural gas etc.), and a complementary means installed on a ship.

The present invention relates more particularly to the case when the coupler is a hydraulic coupler with several clamping modules, in practice three or more, capable of conveying liquid products at very low temperatures (down to −196° C.).

According to a known arrangement, each clamping module comprises a clamping jaw designed for connecting the coupler to a complementary means, such as a manifold, and an actuating system proper to the said jaw and comprising a device of the screw/nut type driven by a motor. The jaw is carried by a system of rods articulated at one of its ends, on a support, the actuating system acting upon the system of rods in order to impel the jaw towards a clamping position or to bring it back to a resting position.

However, in devices of this type that are already known, the forces transmitted by the rods depend on the thickness of the manifold flange at the clamping location which, in practice, varies from one location to another on the flange.

As a result the clamping is often insufficient or excessive.

SUMMARY OF THE INVENTION

The present invention relates, in a general way, to an arrangement that makes it possible to provide, more simply and more reliably, clamping effected by means of the said clamping modules and leading in addition to other advantages.

More precisely, it relates to a clamping assembly for a coupler, comprising at least one clamping module having a clamping jaw designed for connecting the coupler to a complementary means, and an actuating system proper to the said jaw and comprising a device of the screw/nut type driven by a motor, characterized in that the actuating system is connected directly to the jaw and the said jaw is mounted on a support in such a way that it can swivel about a fixed point defined by the said support, the latter being intended to be fixed to the coupler.

In other words, the actuating system acts directly upon the clamping jaw. Having eliminated an intermediary (the rods), it becomes possible to obtain much greater clamping forces than previously, with a system that is simpler and more reliable than the known systems. Moreover, with the clamping assembly according to the invention, the coupler can be used in more situations.

According to preferred characteristics relating to this arrangement:

the device of the screw/nut type is articulated on the jaw at a second point located a fixed distance from the said fixed point; and/or the device of the screw/nut type comprises a screw that engages in a bush with an internal thread and is driven by the motor by means of a chain; and/or the coupler is a hydraulic coupler and the motor is a hydraulic motor; and/or the actuating system is carried by the support.

Furthermore, the arrangement according to the invention lends itself advantageously to a development that is original per se, according to which the assembly comprises several clamping modules whose motors have a fluid connection to a hydraulic unit comprising a fluid distribution circuit and control means designed for controlling the supply of fluid to the motors by the hydraulic unit, so as to cause the jaws associated with the motors to swivel, according to a serial arrangement of the motors so long as the jaws do not exert any clamping force on the complementary means and according to a parallel arrangement of the motors when the said jaws exert a clamping force.

This development gives a high speed of maneuver (serial arrangement of the motors), as well as a large clamping force at the appropriate time (parallel arrangement of the motors).

According to preferred characteristics relating to this development:

the controlling means are, in addition, able to control supply to the motors according to a parallel arrangement so as to overcome the clamping force applied by the jaws to the complementary means, during unclamping of the jaws; and/or the controlling means are sensitive to the increase in pressure in the hydraulic unit, resulting from the clamping force applied by the jaws to the complementary means, and are able to generate the transition from a serial arrangement of the motors to a parallel arrangement of them when the pressure reaches a predetermined value; and/or the controlling means comprise a slide valve provided with a return spring and a pressure limiter with a return spring, installed upstream of the slide valve in the fluid distribution circuit and with fluid connection to the said slide valve; and/or the hydraulic unit comprises a selector installed in the circuit so as to provide fluid connection between the inlet of the first of the motors in the direction of feed of the latter and the pressure limiter, the fluid distribution circuit supplying the motors according to two opposite directions depending on whether it is operating in clamping or unclamping; and/or the fluid distribution circuit comprises a main unit for supply of oil constituting the said fluid.

The arrangement according to the invention also lends itself to another development that is original per se, and can be combined advantageously with the preceding one, and according to which the coupler comprises sealing means that are intended to ensure fluid-tightness of the connection of the coupler to the complementary means, means for protecting the sealing means, movable between a first position before connection, in which the said protecting means go beyond the sealing means in the direction of connection, and a second position after connection, in which the said protecting means are no longer projecting relative to the sealing means, and damping means that permanently exert a force on the protecting means impelling them towards their first position.

With this development there is maximum limitation of the risks connected with relative movements and impacts at the time of connection.

According to preferred characteristics relating to this development:

the coupler comprises means that hold back the protecting means, preventing the said protecting means from going beyond the first position in the direction of connection; and/or the sealing means comprise at least one ring seal and the protecting means comprise a movable ring that surrounds the seal or seals; and/or the sealing means comprise at least one ring seal and the protecting means comprise several thrusters encircling the seal or seals; and/or the damping means consist of a single spring washer, helical springs, spring washers, gas spring jacks or hydraulic dampers interposed between the protecting means and the body of the coupler.

The invention also relates to a hydraulic coupler, comprising a clamping assembly as defined above and fixed to the body of the said coupler.

BRIEF DESCRIPTION OF THE DRAWINGS

The characteristics and advantages of the invention will become clearer from the description that is to follow, by way of an example, referring to the appended schematic drawings, where.

DETAILED DESCRIPTION OF THE INVENTION

Figure 1:
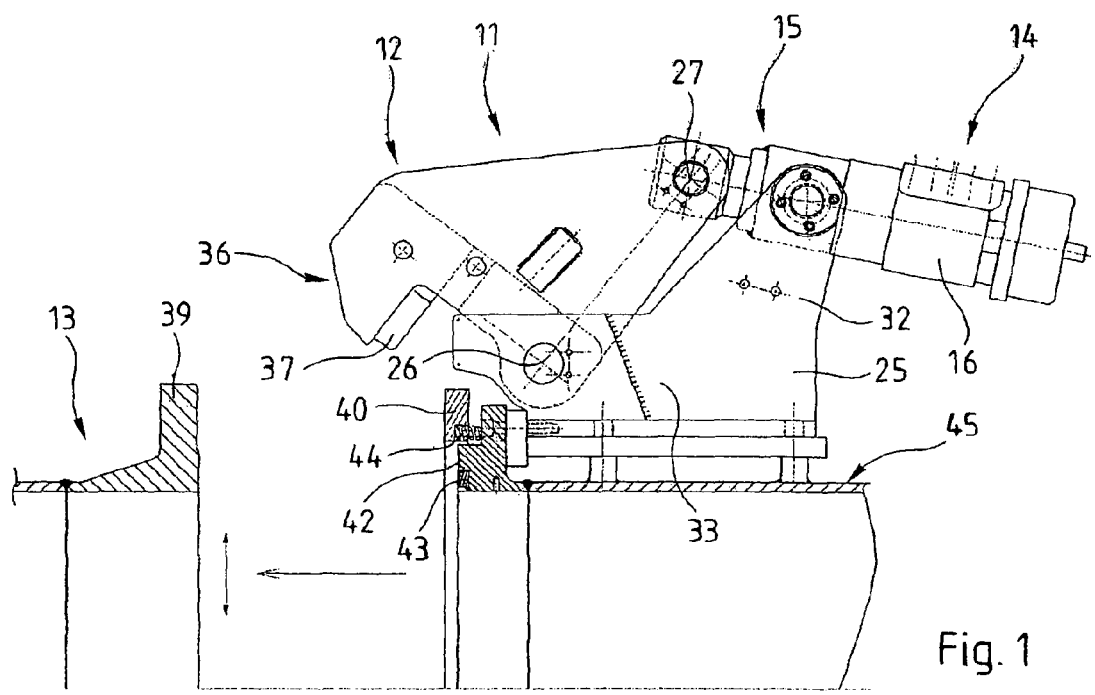
FIG. 1 is a side view with partial section of a hydraulic coupler equipped with a clamping assembly according to the invention and a complementary means, in the non-connected position.

In the embodiment shown, the hydraulic coupler 10 according to the invention comprises a clamping module 11 having a clamping jaw 12 designed for connecting the coupler 10 to a complementary means 13, and an actuating system 14 proper to the said jaw and comprising a device of the screw/nut type 15 driven by a motor 16.

In practice, the clamping modules are three in number, fixed to the periphery of hydraulic coupler 10 and distributed uniformly around the latter and constituting a clamping assembly by which coupler 10 can be connected to the complementary means 13. The said complementary means 13 is, here, a manifold, which can be replaced with a closing cover when the loading arm equipped with coupler 10 is to be put in the storage position.

As the actuating system 14 is well-known, it will not be described in detail here.

It will simply be pointed out that in the embodiment illustrated (see FIG. 3), the device of the screw/nut type 15 comprises a screw 17 that engages in a bush with an internal thread 18 and is driven by the motor 16 by means of a chain 19 transmitting the rotary motion of motor 16 to screw 17 by means of a driving sprocket 20 rigidly locked with the output shaft of motor 16 and a driven sprocket 21 integral with a piece of shaft 22 that is an extension of screw 17. The latter is housed in a cylindrical casing 23, to which a housing 24 is fixed, for housing the chain 19 and sprockets 20 and 21, the motor 16 being fixed to the said housing 24.

Furthermore, the bush with internal thread 18 is slidably guided in the cylindrical casing 23.

According to the invention, each jaw 12 has a swivel mounting on a support 25 about a fixed point 26 defined by the said support 25, the latter being fixed to the hydraulic coupler 10, in the present case by welding.

Figure 3:
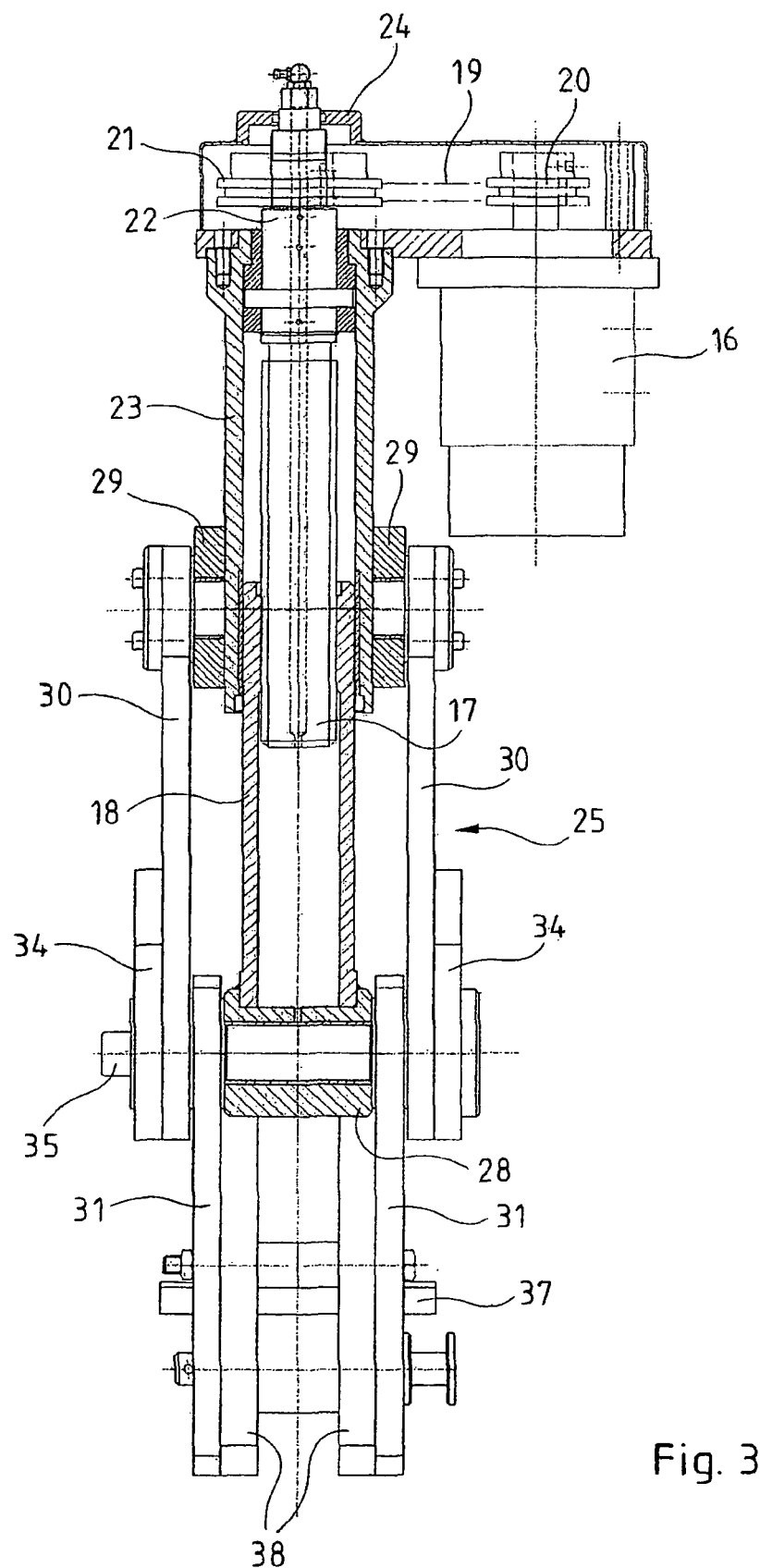
FIG. 3, on a larger scale, is a top view with partial section of the clamping module in FIG. 2.

The device of the screw/nut type 15 is also articulated on jaw 12 at a second point 27 located a fixed distance from point 26 by means of a cylindrical component 28 which is fixed to one end of the bush 18 and is configured to receive a spindle (not shown in FIG. 3).

The actuating system 14 in its turn is swivel mounted on support 25 by means of spindle-receiving disks 29 fixed on the cylindrical casing 23.

It should also be pointed out that support 25 is formed by two plates 30 that which are symmetrical relative to a longitudinal median plane intersecting at right angles the swiveling axes of clamping module 11 and which receive between them the actuating system 14 as well as the jaw 12, which is, in turn, formed by two plates 31 that are symmetrical relative to the said plane.

Figure 2:
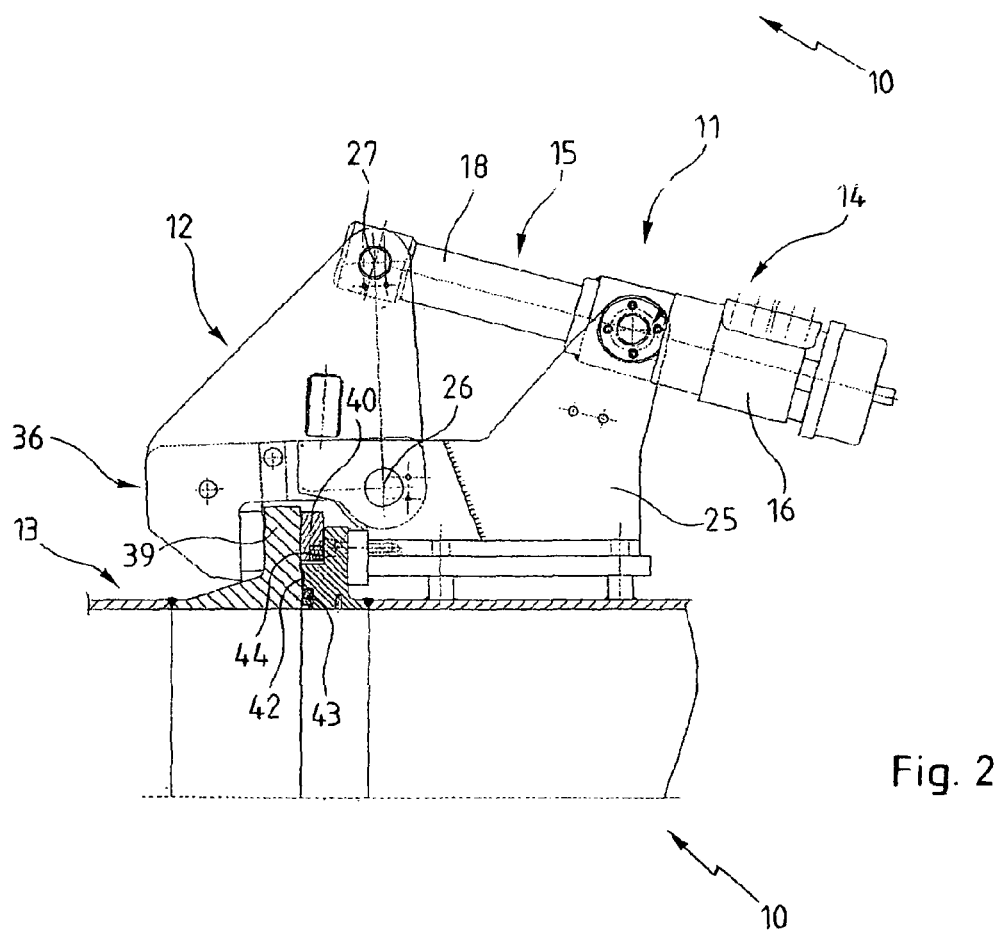
FIG. 2 is a view similar to FIG. 1, and shows the connected position of the hydraulic coupler and of the complementary means.

More precisely, each plate 30 of support 25 comprises a vertical section 32 (see FIGS. 1 and 2), on which the actuating system 14 is swivel-mounted, and a horizontal section 33 defining the fixed point 26.

Each horizontal section 33 is reinforced, in the region of the fixed point 26, by an outer plate 34 welded onto the adjacent plate 30.

Each plate 31 of jaw 12 comprises, according to a general configuration of a right-angled triangle, two holes through which spindles pass, one for the spindle housed in cylindrical component 28 and defining the swivel point 27 and the other for the journal 35 defining the fixed swivel point 26. Holes aligned with the aforementioned holes are of course also provided in the support plates 25.

A clamp 36 carrying a sliding block 37 is fixed to jaw 12. It, too, is formed from two plates 38 that are symmetrical relative to the aforesaid plane, each being fixed to one of the plates 31 forming jaw 12.

It should be pointed out, in this connection, that these plates 38 extend along the side of the substantially triangular plates 31 closest to the hydraulic coupler 10 and they also have a hole through which journal 35 passes. Furthermore, it should also be noted that the sliding block makes it possible to connect the hydraulic coupler 10 to several different diameters of flanges 39 of manifold 13. In practice, and such is the case in the embodiment shown here, these diameters are generally three in number.

Thus, the jaw 12 is pivotably mounted on the support 25 about a low fixed point 26 (proximal point with respect to the coupler 10) defined by the support 25, the device of screw/nut type 15 is articulated directly on the jaw 12 at a high point 27 (distal point with respect to the coupler 10) defined by the jaw 12 and situated at a fixed distance from the low fixed point 26 and the actuating system 14 is itself articulated on the support 25 in the vicinity of the high point 27.

It will also be noted that the clamp 36 of the jaw 12 forms a projection roughly with respect to a third point defined by the jaw 12 and forming a triangle with the low and high points.

Furthermore, the extension of each jaw 12 and of the device 15 of screw/nut type which is associated with it is in the same general direction as that of the body, here cylindrical, of the coupler 10.

Figure 4:
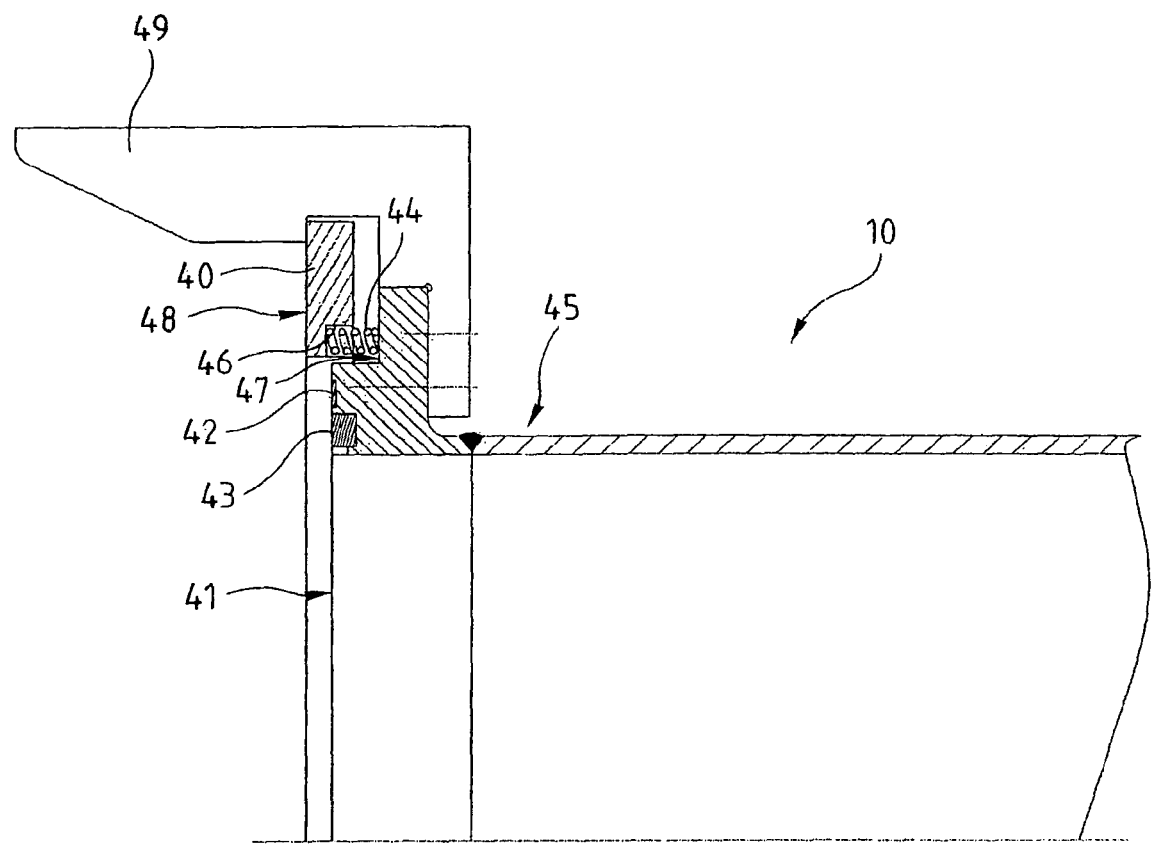
FIG. 4 is a view in longitudinal section of the top half of the front part of the coupler in FIGS. 1 and 2 and illustrates the protecting means of the sealing means of the said coupler.

Moreover, hydraulic coupler 10 is equipped with a system that protects its seals, as can best be seen in FIG. 4.

In the embodiment shown, the hydraulic coupler 10 comprises a protecting ring 40 that is movable relative to the annular front face 41 of coupler 10 and is positioned around ring seals 42 and 43 housed in corresponding grooves in the body 45 of coupler 10. Compression springs, only one of which is visible in FIG. 4, bearing the reference sign 44, are placed between this ring 40 and the body 45 of coupler 10 and act in the axial direction, permanently holding the ring 40 and the body 45 of coupler 10 apart.

In practice, the ring has a groove 46 forming a seat for one of the ends of these springs 44, whereas the body 45 of coupler 10 has an opposite face 47 that is recessed relative to the front face 41 and forms a seat for the opposite end of the said springs 44.

When coupler 10 is in the closed position (see FIG. 2) on a flange 39 of manifold 13, the springs 44 are compressed and flange 39 is in contact with seals 42 and 43 and a front face 48 of ring 40 located on the side of the latter opposite to that with the groove 46.

When coupler 10 is in the open position (see FIG. 1), ring 40 abuts against the centering guides 49 of coupler 10, just one of which is visible in FIG. 4. In this position, the springs 44 are pre-compressed and not completely released.

When coupler 10 is brought closer to flange 39, the seals 42 and 43 are recessed relative to the face 48 of ring 40 and so are protected from any impacts due to flange 39 to be connected. The energy of these impacts is absorbed by the work of compression of springs 44.

Then, during closing of the jaws 12 of coupler 10, springs 44 are compressed by the clamping force exerted by the clamping modules 11. It will be appreciated, in this connection, that the reactive force of ring 40 on flange 39, created by springs 44, makes it possible to eliminate any relative radial movements that could, without this protecting system, cause deterioration of seals 42 and 43 by friction.

In the closed position, the supporting force of seals 42 and 43 is equal to the clamping force of jaws 12 minus the force of compression of springs 44. In practice, therefore, the clamping force of jaws 12 must be chosen in such a way that it is much greater than the force of compression of springs 44.

Moreover, various types of damping springs can be used:
a single spring washer with the same diameter as the groove of ring 40,
one or a number of helical springs,
one or a number of spring washers,
gas spring jacks or hydraulic dampers.

According to a variant of this protecting system, ring 40 can be replaced with thrusters positioned around seals 42 and 43 and connected to the damping means defined above.

Other solutions for abutment can also be used, such as pins fixed to the body 45 and equipped with a head retaining ring 40.

For supplying oil to the hydraulic motors 16 of the clamping modules 11, a hydraulic unit with a fluid distribution circuit is also provided, as is best seen in FIGS. 5 to 10.

The said hydraulic unit 50 comprises, according to the invention, a slide valve 51 provided with a return spring and a pressure limiter 52 with a return spring, installed upstream of valve 51 in the distribution circuit and with fluid connection to the said valve 51.

The hydraulic unit 50 also has a selector 54 arranged in the fluid distribution circuit to provide fluid connection between the inlet of the first of the motors $16_1$-$16_3$, in their direction of supply, and pressure limiter 52. Depending on whether the unit is acting for clamping or unclamping of jaws 12, the first motor is motor $16_1$ or $16_3$.

The said hydraulic unit 50 is in addition supplied with oil by a central unit 55 comprising a distributor 56 and two non-return valves with controllable throttling 57, connected respectively to a closing line and an opening line connecting the central unit 55 to hydraulic unit 50.

As can be seen in FIGS. 5 to 10, the fluid distribution circuit of hydraulic unit 50 is designed for supplying all the motors $16_1$-$16_3$ with the oil flow and pressure that they require, and at any time. According to the invention, for this purpose the hydraulic unit 50 operates according to the series/parallel principle.

More precisely, during the stages of approach for closing, the clamping modules 11 with jaws $12_1$-$12_3$ maneuver rapidly. For this, the hydraulic unit operates in series (low pressure and high flow rate). For clamping onto a flange 39, the unit operates in parallel (high pressure and low flow rate).

When coupler 10 is clamped on a flange 39, for unclamping it the hydraulic unit 50 has to supply a lot of pressure to each of the motors $16_1$-$16_3$: therefore it operates in parallel. As soon as all of the clamping modules 11 are unclamped, hydraulic unit 50 changes to series operation to give quick opening.

Series/parallel changeover of hydraulic unit 50 occurs in relation to the forces transmitted and to be transmitted to the clamping modules 11. It is the slide valve inside hydraulic unit 50 that permits changeover either to series operation or to parallel operation. The position of this slide valve depends on the forces transmitted by the clamping modules 11. When there is no force acting on the clamping modules 11, hydraulic unit 50 puts itself in the series position. As soon as a clamping module 11 forces or presses against something (flange, stop etc.), the supply pressure of the series circuit increases and moves the slide valve towards its position for supplying motors $16_1$-$16_3$ in parallel, so as to deliver the maximum available pressure to each of these motors. Modules 11 then have a low speed but a high transmissible force. Conversely, when there is no longer any force on anyone of the clamping modules 11, the internal pressure of hydraulic unit 50 decreases and thus allows the slide valve to move to its series position.

The operation of hydraulic unit 50 will now be described in greater detail, referring to FIGS. 5 to 10.

Figure 5:
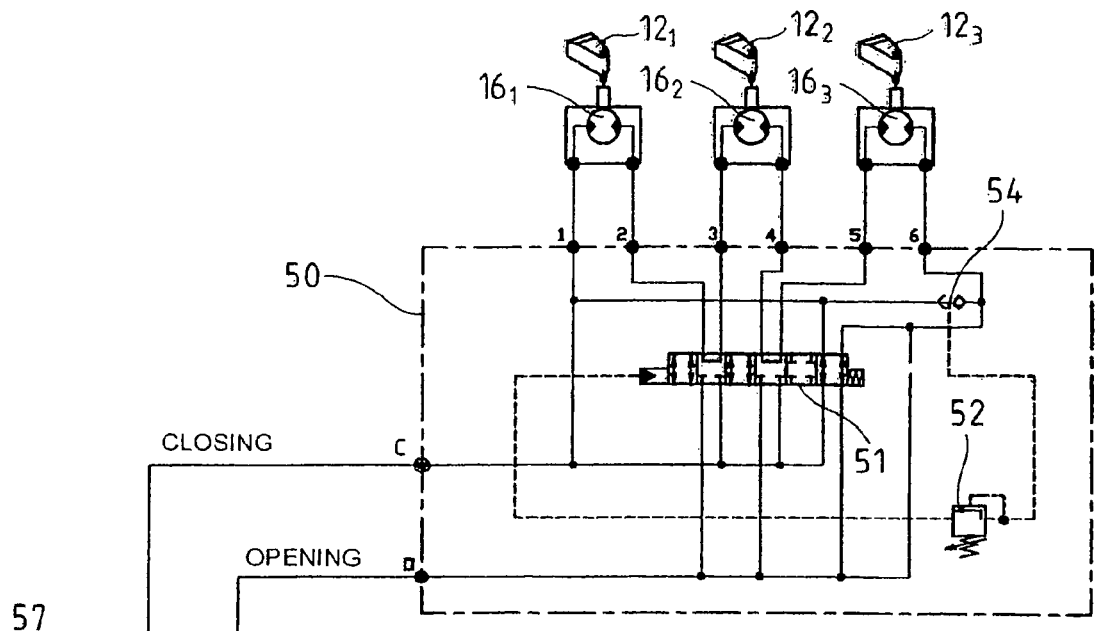
FIGS. 5 to 10 are schematic diagrams of the hydraulic unit supplying the motors of the clamping modules according to the invention, and illustrate the various stages in operation of this unit.
Figure 5:
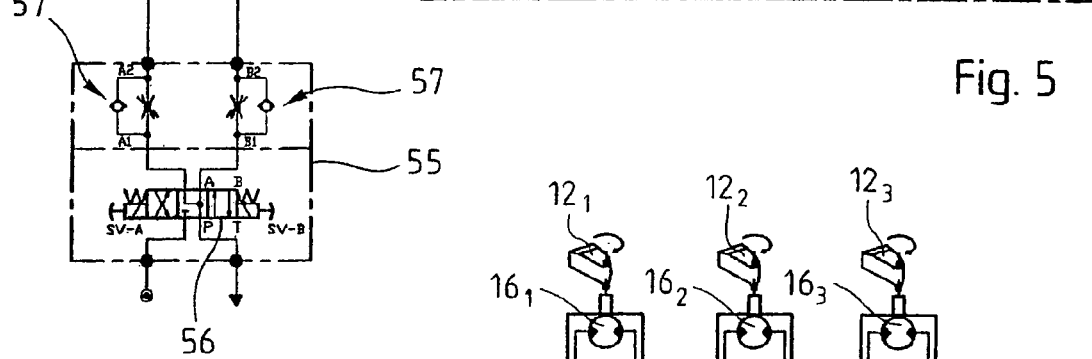

FIG. 5: (Coupler 10 in the Open Position)

No movement is "demanded" from coupler 10. There is no circulation of oil in the hydraulic circuit. In this state (rest), the hydraulic unit is systematically in the series position. The slide valve of unit 50 is pushed towards the left by its return spring.

Figure 6:
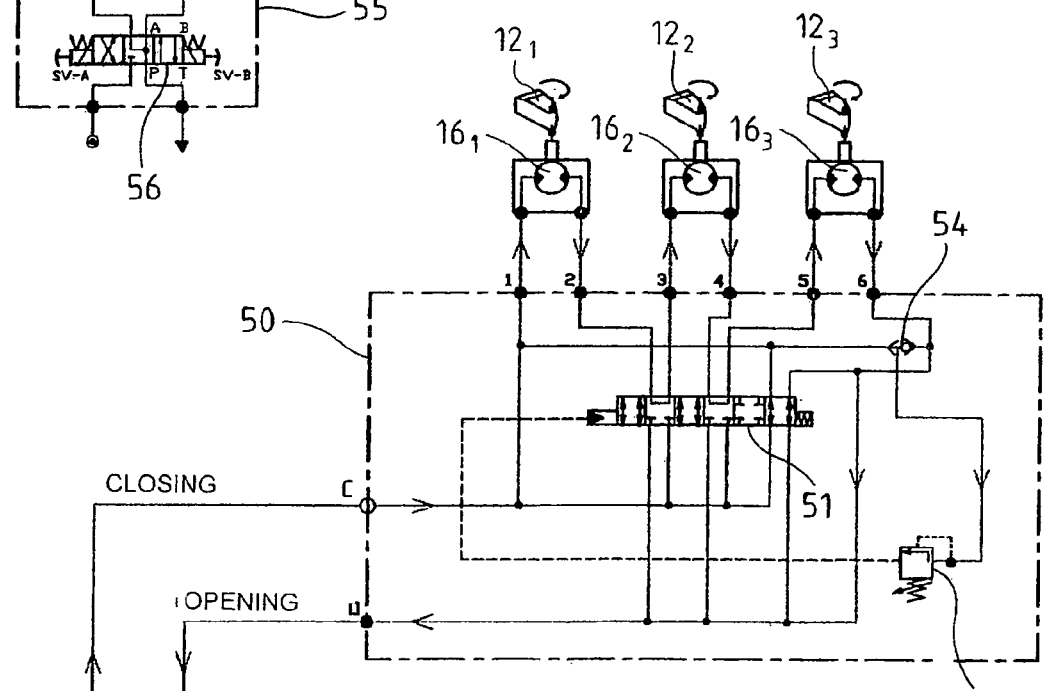
Figure 6:
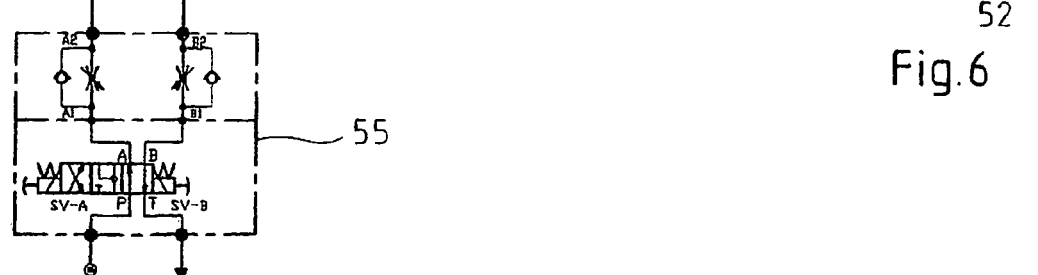

FIG. 6: (Coupler 10 in Course of Closing)

During this approach phase, no force of resistance is received by the clamping modules 11. Hydraulic unit 50 therefore operates in series, so that there is rapid movement of modules 11. The oil leaving motor $16_1$ goes into motor $16_2$ after briefly passing through hydraulic unit 50, then leaves it again and enters the unit and then motor $16_3$, before returning to the central unit 55.

Figure 7:
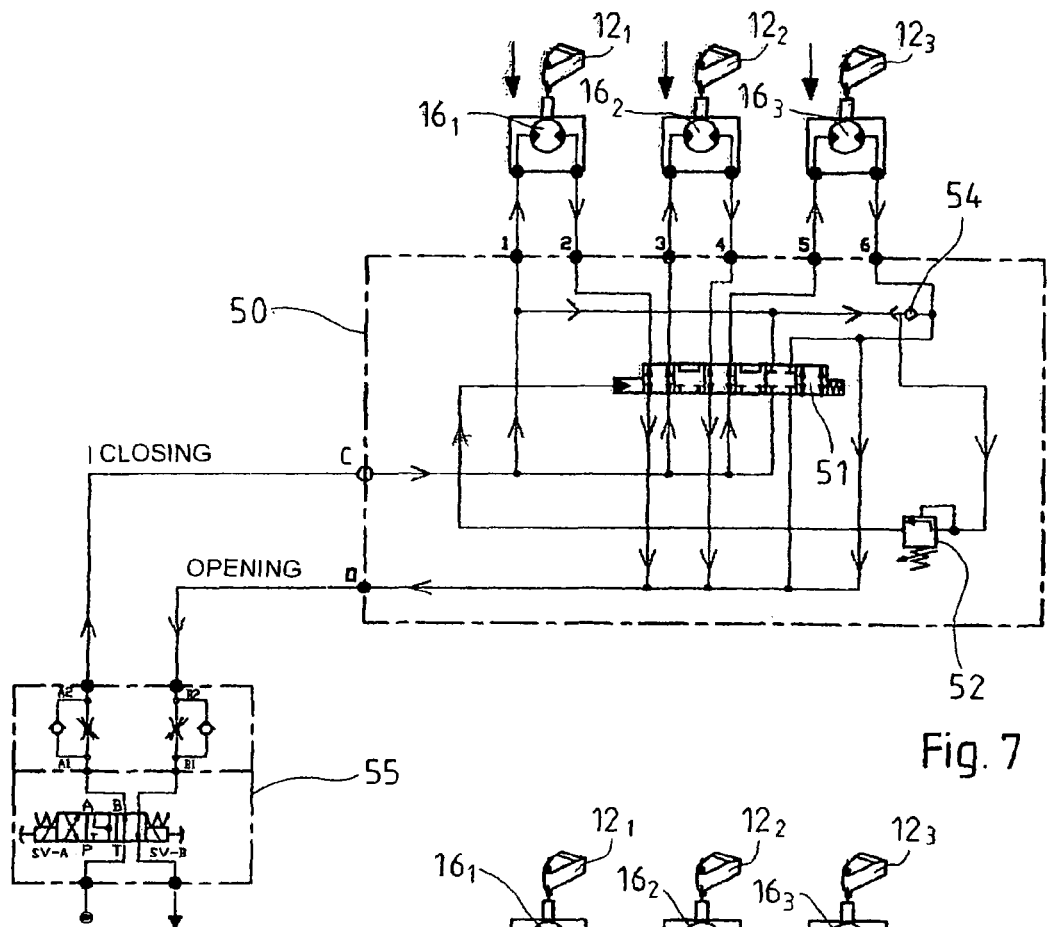

FIG. 7: (Coupler 10 in the Clamping Phase)

During the clamping phase, a resistance appears at the jaws $12_1$-$12_3$, giving rise to an increase in the hydraulic pressure of the circuit. The pressure will therefore push the valve slide in hydraulic unit 50 towards the right in the diagrams. At that moment, unit 50 will therefore change over to the parallel position, which means that each motor $16_1$-$16_3$ will be supplied directly by the central unit 55 and not by the preceding motor. The flow will therefore be divided as a function of the number of motors. On the other hand the pressure will increase. At the outlet of each motor $16_1$-$16_3$, the oil returns directly to the central unit 55.

Figure 8:
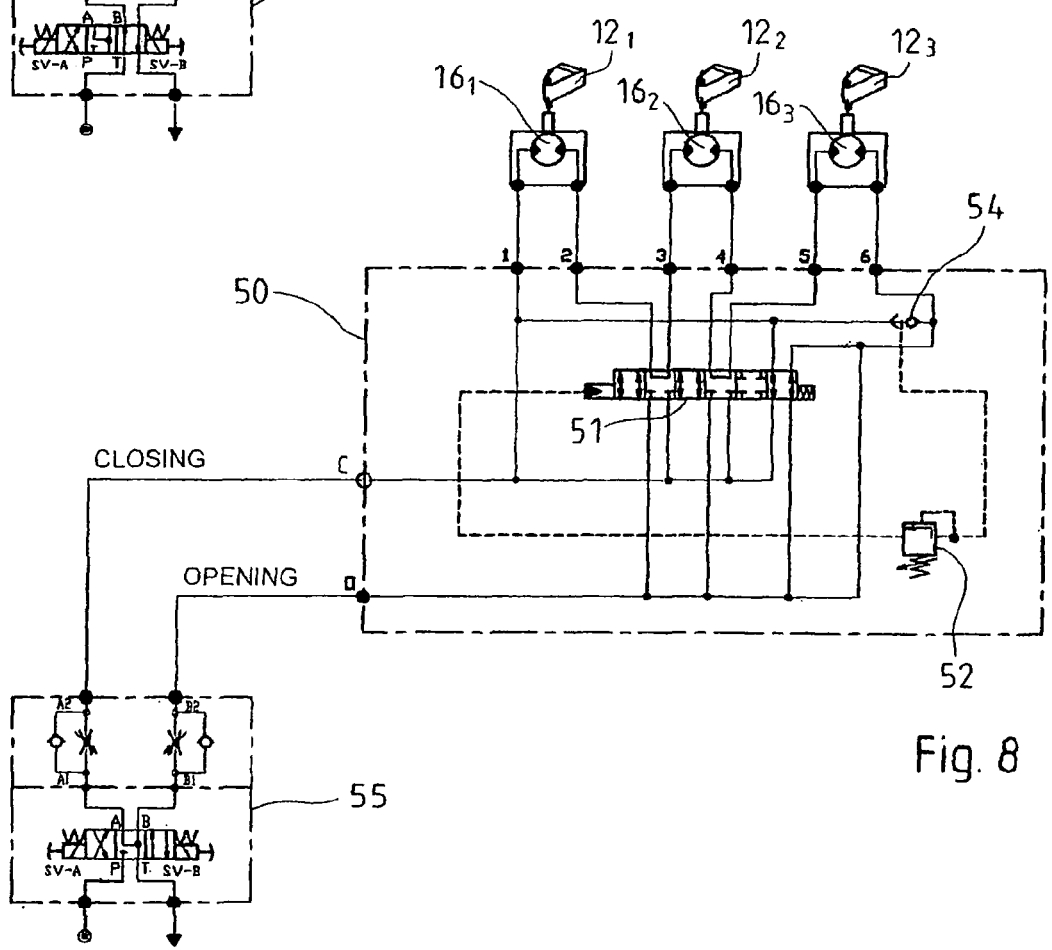

FIG. 8: (Coupler 10 Closed)

Once coupler 10 is closed, oil circulation stops. The slide valve in unit 50 therefore goes back to the series position (displaced towards the left in the diagrams), under the action of its return spring.

Figure 9:
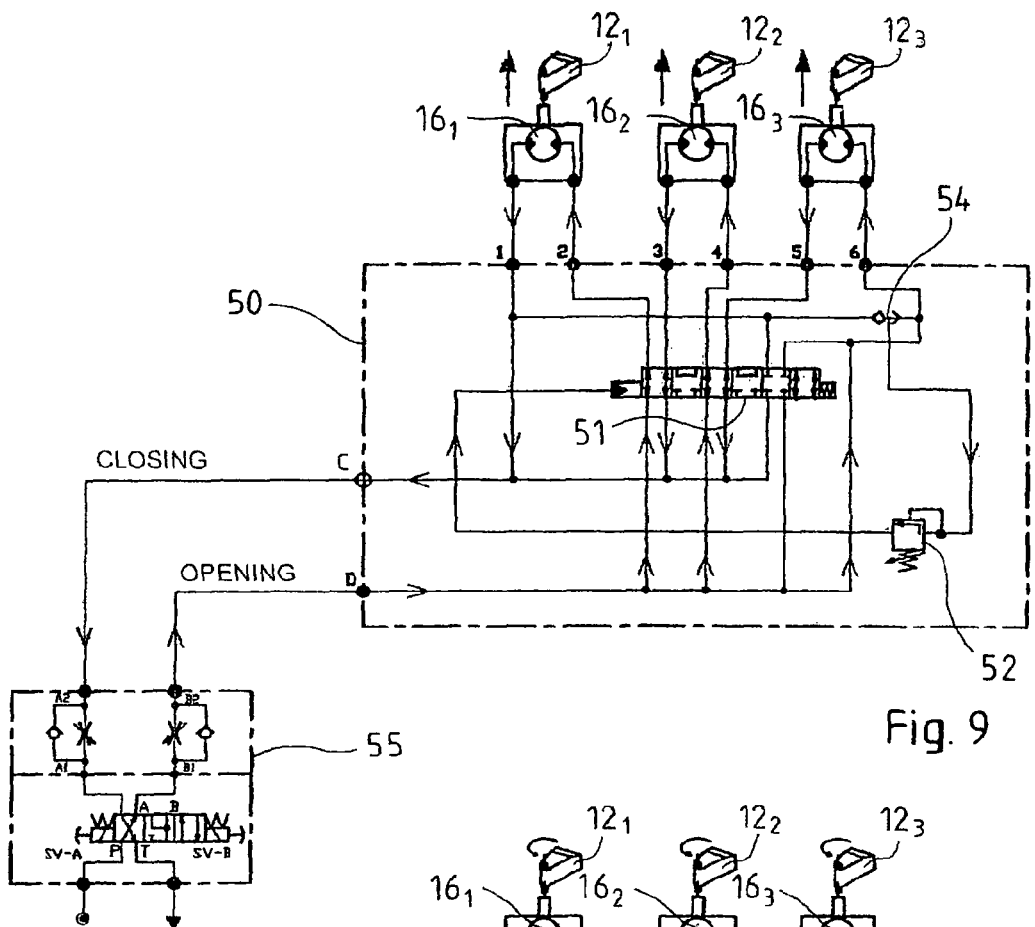

FIG. 9: (Unclamping of Coupler 10)

At the moment of opening, it is necessary to overcome the forces due to clamping. These forces have the effect of raising the pressure within the hydraulic circuit, and therefore of causing unit 50 to change to the parallel position (the pressure displaces the valve slide of unit 50 towards the right in the diagrams). Each jaw $12_1$-$12_3$ therefore has a high oil pressure at its disposal, which enables them to be unclamped.

Figure 10:
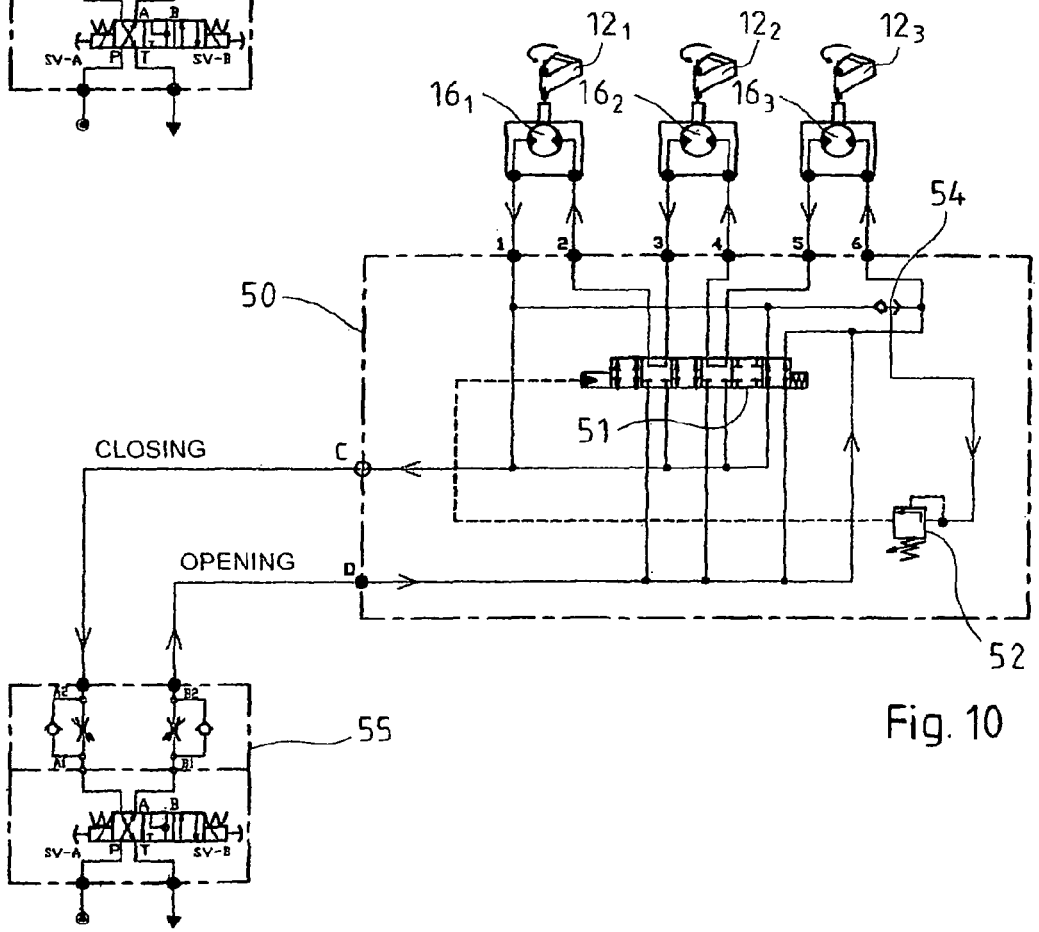

FIG. 10: (Opening of Coupler 10)

Once coupler 10 is unclamped, there is no longer any force to be overcome. The internal pressure of the hydraulic circuit decreases, causing the valve slide in unit 50 to move towards the left in the diagrams. During this opening phase, unit 50 is in the series position, permitting rapid movement of jaws $12_1$-$12_3$.

In practice, it may be noted, as a non-limiting example, that for a maximum outlet pressure of central unit 55 of about $150 \times 10^5$ Pa, the pressure value causing the slide to move from a position in series to a position in parallel is about $80$-$90 \times 10^5$ Pa.

In the embodiment shown in FIGS. 5 to 9, movement of the slide from a series position to a parallel position depends on whether the pressure limiter is in the open or closed position, these positions depending in their turn on the return spring chosen for the said limiter 52.

However, in other embodiments it would be possible for the slide valve 51 to be designed so that it changes from one position to the other by an appropriate choice of return spring for it. In this case it will not be necessary to employ a pressure limiter 52.

It would also be possible, in another embodiment, to employ detectors of the position of the jaws or of the pressure at motors $16_1$-$16_3$ and electric control of slide valve 51.

The actuating system 14 may also be borne by a support different to that on which is mounted the jaw 12 associated with it.

The support or supports may, moreover, also be formed integrally with the coupler.

Of course, the present invention is not limited to the embodiment that has been described and illustrated, but encompasses all variants of execution.

What is claimed is:

1. A coupler which is adapted to be connected to a complementary means for the transfer of a fluid between the coupler and the complementary means, the complementary means comprising a tubular flow member having a first transverse end flange defining a first annular end face, the coupler comprising:
    a body which is releasably connectable to the tubular flow member, the body having a second transverse end flange defining a second annular end face which engages the first annular end face when the body is connected to the flow member;
    at least one seal which is mounted on the second annular end face for providing a fluid-tight seal between the first and second annular end faces;
    means for protecting the at least one seal;
    the protecting means comprising a ring which is mounted concentrically over the second transverse end flange and is movable by the complementary means between a first position before connection in which the ring projects beyond the at least one seal in the direction of connection, and a second position after connection in which the ring no longer projects beyond the at least one seal; and
    damping means positioned between the second end flange and the ring for urging the ring towards its first position
    wherein the ring does not engage the at least one seal in either its first or second position.

2. The coupler of claim 1, further comprising retaining means for preventing the ring from projecting beyond the first position in the direction of connection.

3. The coupler of claim 1, wherein the at least one seal comprises at least one ring seal and the ring encircles the ring seal.

4. The coupler of claim 3, wherein the damping means comprises one selected from the group consisting of a number of spring washers, a number of helical springs, a number of gas spring jacks and a number of hydraulic dampers, each of which is interposed between the ring and the second end flange.

5. A coupler which is adapted to be connected to a complementary means for the transfer of a fluid between the coupler and the complementary means, the complementary means comprising a tubular flow member having a first transverse end flange defining a first annular end face, the coupler comprising:
    a body which is releasably connectable to the tubular flow member, the body having a second transverse end flange defining a second annular end face which engages the first annular end face when the body is connected to the flow member;
    at least one seal which is mounted on the second annular end face and which provides a fluid-tight seal between the first and second annular end faces when the coupler is connected to the complimentary means;
    means movably mounted on the body for protecting the at least one seal;
    the protecting means being movable by the first transverse end flange between a first position before connection in which the protecting means projects beyond the at least one seal in the direction of connection, and a second position after connection in which the protecting means no longer projects beyond the at least one seal; and
    damping means for urging the protecting means towards its first position.

6. The coupler of claim 5, further comprising retaining means connected to the body for preventing the protecting means from projecting beyond the first position in the direction of connection.

7. The coupler of claim 5, wherein the at least one seal comprises at least one ring seal and the protecting means comprises a movable ring which encircles the ring seal.

8. The coupler of claim 5, wherein the damping means comprises one selected from the group consisting of a number of spring washers, a number of helical springs, a number of gas spring jacks and a number of hydraulic dampers, each of which is interposed between the protecting means and the body of the coupler.

* * * * *